(12) United States Patent
Nemoto et al.

(10) Patent No.: US 9,790,405 B2
(45) Date of Patent: Oct. 17, 2017

(54) PHOTOCURABLE ADHESIVE COMPOSITION

(71) Applicant: ThreeBond Fine Chemical Co., Ltd., Sagamihara-shi, Kanagawa (JP)

(72) Inventors: Takashi Nemoto, Sagamihara (JP); Yoshihide Arai, Sagamihara (JP); Kenichi Horie, Sagamihara (JP)

(73) Assignee: Threebond Fine Chemical Co., Ltd., Kanagawa (JP)

(*) Notice: Subject to any disclaimer, the term of this patent is extended or adjusted under 35 U.S.C. 154(b) by 209 days.

(21) Appl. No.: 14/633,855

(22) Filed: Feb. 27, 2015

(65) Prior Publication Data

US 2015/0166842 A1    Jun. 18, 2015

Related U.S. Application Data

(62) Division of application No. 13/122,521, filed as application No. PCT/JP2009/004580 on Sep. 14, 2009, now abandoned.

(30) Foreign Application Priority Data

Oct. 4, 2008    (JP) .................. 2008-259127

(51) Int. Cl.
| | |
|---|---|
| *B05D 5/06* | (2006.01) |
| *C09J 7/00* | (2006.01) |
| *C08G 18/67* | (2006.01) |
| *C08G 18/75* | (2006.01) |
| *C09J 171/00* | (2006.01) |
| *C09J 175/16* | (2006.01) |
| *B32B 37/12* | (2006.01) |
| *B32B 37/18* | (2006.01) |
| *C08L 71/00* | (2006.01) |
| *C08L 75/16* | (2006.01) |
| *G02F 1/1333* | (2006.01) |
| *C09J 175/14* | (2006.01) |

(52) U.S. Cl.
CPC .............. *C09J 7/00* (2013.01); *B32B 37/1284* (2013.01); *B32B 37/18* (2013.01); *C08G 18/672* (2013.01); *C08G 18/755* (2013.01); *C09J 171/00* (2013.01); *C09J 175/16* (2013.01); *B32B 2037/1253* (2013.01); *B32B 2457/202* (2013.01); *C08G 2650/56* (2013.01); *C08L 71/00* (2013.01); *C08L 75/16* (2013.01); *C09J 175/14* (2013.01); *C09J 2203/318* (2013.01); *C09J 2471/00* (2013.01); *C09J 2475/00* (2013.01); *G02F 1/133308* (2013.01); *G02F 2001/13332* (2013.01); *G02F 2001/133325* (2013.01); *G02F 2202/28* (2013.01); *Y10T 428/1077* (2015.01)

(58) Field of Classification Search
CPC ...... C09J 175/16; C09J 175/06; C09J 175/08; C09J 175/14; C08G 18/44; C08G 2650/56; C08L 75/16; C08J 171/00; G02F 2202/28
USPC .... 427/162, 164, 520; 428/1.54, 423.1, 413; 430/281.1, 270.1, 284.1; 522/97, 98; 156/60
See application file for complete search history.

(56) References Cited

U.S. PATENT DOCUMENTS

| | | |
|---|---|---|
| 5,731,050 A | 3/1998 | Kotsubo et al. |
| 6,180,200 B1 | 1/2001 | Ha et al. |

FOREIGN PATENT DOCUMENTS

| | | |
|---|---|---|
| JP | 63-083182 | 4/1988 |
| JP | 63-083184 | 4/1988 |
| JP | 11-074313 | 3/1999 |
| JP | 11-116903 | 4/1999 |
| JP | 11-236535 | 8/1999 |
| JP | 11-238538 | 8/1999 |
| JP | 2001-163931 | 6/2001 |
| JP | 2004-197016 | 7/2004 |
| JP | 2006-173100 | 6/2006 |
| JP | 2007-009201 | 1/2007 |
| JP | 2007-23147 | 2/2007 |
| JP | 2009-120683 | 6/2009 |
| WO | WO-2005/090509 | 9/2005 |

*Primary Examiner* — Ruiyun Zhang
(74) *Attorney, Agent, or Firm* — Norris McLaughlin & Marcus, P.A.

(57) ABSTRACT

Provided is a method of manufacturing a liquid crystal panel employing a photocurable adhesive composition which causes no damage to adherends during bonding and which, when used in bonding rugged adherends, can bond the adherends without forming a gap therebetween. The photocurable adhesive composition of the inventive method comprises (A) 100 parts by mass of a urethane (meth)acrylate oligomer having a weight-average molecular weight of 20,000 to 100,000, (B) 5 parts to 70 parts by mass of a phenoxy resin, and (C) 0.1 parts to 10 parts by mass of a photopolymerization initiator. The uncured composition has a loss tangent (loss modulus/storage modulus) of less than 1 at 25° C. and the temperature at which the loss tangent of the uncured composition reaches 1 or more is 80° C. or less.

5 Claims, No Drawings

PHOTOCURABLE ADHESIVE COMPOSITION

STATEMENT OF RELATED APPLICATIONS

The present application is a divisional application of copending U.S. application Ser. No. 13/122,521 filed May 12, 2011, which is U.S. national stage of International Application No. PCT/JP2009/004580, filed Sep. 14, 2009. The disclosures of these applications are incorporated herein by reference.

BACKGROUND OF THE INVENTION

The present invention relates to a photocurable adhesive composition, and in particular, a photocurable adhesive composition suitable for bonding of a liquid crystal panel.

A conventional cover panel for protecting a liquid crystal panel is slightly spaced from the liquid crystal panel. The cover panel and the liquid crystal panel are bonded by filling the space therebetween with an ultraviolet curable liquid resin, in order to make a product thinner and to enhance the brightness and the rigidity of the module. Examples of the ultraviolet curable resin include an active energy-ray-curable composition for optical materials containing a predefined amount of polyurethane (meth)acrylate that is produced by reacting a reaction product of isophoronediisocyanate and alkane diol at a predetermined ratio with (meth)acrylate having one hydroxyl group per molecule, and a predefined amount of a compound having a predetermined molecular weight and a (meth)acryloyl group (Japanese Patent Application Laid-Open 2007-23147). Unfortunately, the bonding process using such a liquid resin inevitably has a disadvantage in that air bubbles are trapped or the resin runs off from the edges when the liquid crystal panel is bonded with the cover panel, due to bumps on the cover panel formed by, for instance, printing.

There is also known the method of bonding a cover panel and a liquid crystal panel with a two-sided adhesive tape. However the two-sided adhesive tape, which has no flowability, cannot fill bumps on the cover panel formed by printing.

Alternatively, a method for bonding a cover panel and a liquid crystal panel using a photocurable adhesive sheet has been investigated. For instance, there is proposed a photocurable adhesive sheet being formed of a cationically photopolymerizable adhesive composition which comprises an acrylic polymer produced by copolymerizing an acrylic monomer with a radically polymerizable compound having a cationically polymerizable group, and a cationically photopolymerizable initiator (Japanese Patent Application Laid-Open HEI-11(1999)-116903).

However, the curing reaction by photo-cations has problems such as a low curing rate compared to photo-radical reaction and the inhibition of the curing by contained water. As a result, adhesion by a curable resin composition containing a photo-cationic curing system is not preferred for adhesion processes that require high production efficiency, such as bonding of a liquid crystal panel.

There is known an adhesive which employs a photo-radical reaction, for instance, an adhesive for electrically connecting and bonding two facing electrodes, which comprises a modified phenoxy resin having urethane bonds, urethane acrylate, and a radical reaction initiator (Japanese Patent Application Laid-Open 2007-9201). The adhesive is, however, not used for bonding a liquid crystal panel. As described in an example in Patent Literature 3, if the adhesive is applied to a liquid crystal panel as an adherend, it may severely damage the liquid crystal body due to its high curing temperature of 130° C. In addition, the urethane acrylate has a very small weight-average molecular weight of approximately 1,100.

SUMMARY OF THE INVENTION

The present invention provides a photocurable adhesive composition which does not damage adherends during bonding processes, and can bond rugged adherends without forming a gap therebetween. In particular, the present invention provides a photocurable adhesive composition which can melt at low temperature causing no damage to a liquid crystal panel, and can bond the liquid crystal panel to a cover panel without forming a gap therebetween by following bumps formed by printing on the cover panel in the case of bonding a liquid crystal panel and a cover panel.

In particular, a solid adhesive at ordinary temperature is preferable for bonding of a liquid crystal panel with a cover panel thereof, in order to avoid trapping of air bubbles or running off of the resin from the edge as much as possible. High production efficiency is, however, not achieved with an adhesive capable of photo-cationic polymerization. Although the use of an adhesive employing a photo-radical reaction is conceivable, the solid adhesive at ordinary temperature must be heated to a temperature of 100° C. or more for melting and curing, as described in Patent Literature 3. Curing at such a high temperature during bonding of a liquid crystal panel with a cover panel therefor severely damages the liquid crystal panel. The present inventors had attempted a variety of investigations on solid adhesives at ordinary temperature and capable of melting and curing at a temperature of 80° C. or less that does not damage the liquid crystal panel. As a result, the present inventors found that use of a photocurable adhesive composition having a proper proportion of a urethane (meth)acrylate oligomer with a weight-average molecular weight within a predetermined range, a phenoxy resin, and a photopolymerization initiator, and having a loss tangent that is adjusted to a predetermined value can solve the problems described above, and have accomplished the invention.

The present invention provides:

(1) A photocurable adhesive composition comprising (A) 100 parts by mass of a urethane (meth)acrylate oligomer having a weight-average molecular weight of 20,000 to 100,000, (B) 5 parts to 70 parts by mass of a phenoxy resin, and (C) 0.1 part to 10 parts by mass of a photopolymerization initiator, wherein an uncured composition of the photocurable adhesive composition has a loss tangent (loss modulus/storage modulus) of less than 1 at 25° C., and the temperature at which the loss tangent of the uncured composition reaches 1 or more is 80° C. or less.

As preferred Aspects of the present invention, mention may be made of:

(2) The photocurable adhesive composition according to Aspect (1), wherein (A) urethane (meth)acrylate oligomer has a weight-average molecular weight in a range of 40,000 to 100,000;

(3) The photocurable adhesive composition according to Aspect (1), wherein (A) urethane (meth)acrylate oligomer has a weight-average molecular weight in a range of 50,000 to 70,000;

(4) The photocurable adhesive composition according to any one of Aspects (1) to (3), wherein the amount of (B) phenoxy resin is 10 parts to 60 parts by mass;

(5) The photocurable adhesive composition according to any one of Aspects (1) to (3), wherein the amount of (B) phenoxy resin is 40 parts to 50 parts by mass;

(6) The photocurable adhesive composition according to any one of Aspects (1) to (5), wherein the amount of (C) photopolymerization initiator is 0.5 parts to 6 parts by mass;

(7) The photocurable adhesive composition according to any one of Aspects (1) to (5), wherein the amount of (C) photopolymerization initiator is 3 parts to 6 parts by mass;

(8) The photocurable adhesive composition according to any one of Aspects (1) to (7), wherein the uncured composition has a loss tangent of 0.1 to 0.6 at 25° C.:

(9) The photocurable adhesive composition according to any one of Aspects (1) to (8), wherein the temperature at which the loss tangent of the uncured composition reaches 1 or more is in a range of 40° C. to 80° C.;

(10) The photocurable adhesive composition according to any one of Aspects (1) to (9), wherein the uncured composition is solid at 25° C. and melts at a temperature of 80° C. or less;

(11) The photocurable adhesive composition according to any one of Aspects (1) to (9), wherein the uncured composition is solid at 25° C. and melts at a temperature in a range of 40° C. to 80° C.:

(12) The photocurable adhesive composition according to any one of Aspects (1) to (11), wherein the uncured composition is in a form of sheet or film;

(13) The photocurable adhesive composition according to any one of Aspects (1) to (12), wherein a cured composition of the photocurable adhesive composition has an elastic modulus of $1.0 \times 10^4$ Pa to $1.0 \times 10^9$ Pa;

(14) The photocurable adhesive composition according to any one of Aspects (1) to (12), wherein a cured composition of the photocurable adhesive composition has an elastic modulus of $1.0 \times 10^5$ Pa to $1.0 \times 10^7$ Pa:

(15) The photocurable adhesive composition according to any one of Aspects (1) to (14), wherein the cured composition has a total light transmittance of 85% or more;

(16) The photocurable adhesive composition according to any one of Aspects (1) to (15) for bonding a liquid crystal panel;

(17) A laminate structure bonded with the photocurable adhesive composition according to any one of Aspects (1) to (16); and

(18) A laminate structure comprising a liquid crystal panel and a cover panel thereof bonded with the photocurable adhesive composition according to any one of Aspects (1) to (16).

The photocurable adhesive composition of the present invention can be melted at low temperature, causing no damage to adherends during bonding processes. In particular, its use for bonding a liquid crystal panel to a cover panel causes no damage to the liquid crystal panel. In the case of bonding rugged adherends with the composition, the bonding can be achieved without generation of a gap between the adherends. In particular, the composition follows bumps formed by printing on the cover panel, enabling bonding of the liquid crystal panel to the cover panel without generation of a gap therebetween. In addition, the laminated composition does not run off from the edges, ensuring a good appearance. Since the uncured composition is solid, preferably in a form of sheet or film, at ordinary temperature, it can be readily handled. Since the cured composition is flexible, an adherend, in particular liquid crystal, is not damaged. Since the composition does not melt by reheating, the cover panel can be stably retained.

DETAILED DESCRIPTION OF THE INVENTION

In the photocurable adhesive composition of the present invention, The upper limit of the loss tangent at 25° C. for the uncured composition (the photocurable adhesive composition before curing) is less than 1, preferably 0.6, and the lower limit is preferably 0.1. Above the upper limit, the uncured composition cannot be present in a solid state at ordinary temperature, for instance, in a form of sheet or film. Furthermore, the composition tends to trap air bubbles or run off the resin from the edge during bonding, like liquid adhesives. In the photocurable adhesive composition of the present invention, the temperature at which the loss tangent of the uncured composition reaches 1 or more is 80° C. or less, and preferably in the range of 40° C. to 80° C. A temperature above the upper limit is not preferable, because the high melting point of the uncured composition causes damages to adherends such as a liquid crystal panel during bonding. At a temperature below the lower limit, the composition cannot be present in a solid state at ordinary temperature, for instance, in a form of sheet or film. Loss tangent, also referred to as tan δ, indicates the ratio of loss modulus (G″) to storage modulus (G′) (loss modulus G″/storage modulus G′). At a loss tangent of less than 1, solid characteristics are dominant, while at a loss tangent of not less than 1, liquid characteristics are dominant. For bonding of adherends with the photocurable adhesive composition of the present invention, the photocurable adhesive composition must be melted by heat in order to develop flowability and wet the adherends. The flowability can be developed at a loss tangent of not less than 1. Most liquid crystal panels, however, have an allowable temperature limit of 80° C. or less, and a temperature load above 80° C. may cause defects in display. Therefore, when the temperature at which the loss tangent of dynamic viscoelasticity reaches 1 or more is 80° C. or less, the liquid crystal panel can be bonded without damage to the panel.

The upper limit of the weight-average molecular weight for (A) the urethane (meth)acrylate oligomer used in the present invention is 100,000, preferably 70,000, and the lower limit is 20,000, preferably 40,000, more preferably 50,000. Above the upper limit, the urethane (meth)acrylate cannot be readily synthesized, resulting in the lack of feasibility. Even if the oligomer is synthesized, the uncured composition has a high melting temperature due to the lack of flowability by heating. Consequently, during bonding of a liquid crystal panel and a cover panel, the composition causes damages to the liquid crystal and cannot follow bumps formed by printing on the cover panel. At a weight-average molecular weight below the lower limit, the uncured composition cannot be present in a solid state at ordinary temperature.

Component (A) urethane (meth)acrylate oligomer in the present invention may be used without any limitation. It is preferred that the urethane (meth)acrylate oligomer in the present invention is a reaction product of a polyol compound having at least two active hydroxyl groups per molecule, an organic isocyanate compound having at least two isocyanate groups per molecule, and (meth)acrylate having at least one hydroxyl group per molecule.

Examples of the polyol compound having at least two active hydroxyl groups per molecule include polyether polyols, polyester polyols, caprolactone diols, and polycarbonate diols. In particular, polycarbonate diols are preferable, because a durable cured composition (photocurable adhesive composition after curing) can be produced. More preferably, polycarbonate diol produced by copolymerization of 1,6-hexanediol, 1,5-pentanediol, and dialkyl carbonate having one to six carbon atoms is used, because a flexible cured composition that causes no damage to liquid crystal can be produced.

Examples of the organic isocyanate compound having at least two isocyanate groups per molecule include 2,4-tolylene diisocyanate, 2,6-tolylene diisocyanate, 1,3-xylylene diisocyanate, 1,4-xylylene diisocyanate, tetramethylxylylene diisocyanate, diphenylmethane diisocyanate, hexamethylene diisocyanate, lysine diisocyanate, isophorone diisocyanate, bis(4-isocyanatocyclohexyl)methane, 1,3-bis(isocyanatomethyl)cyclohexane, 1,4-bis(isocyanatomethyl)cyclohexane, and norbornane diisocyanate. In particular, saturated diisocyanate such as isophorone diisocyanate or hexamethylene diisocyanate is preferable, because a durable cured composition can be produced. More preferably, isophorone diisocyanate, bis(4-isocyanatocyclohexyl)methane, 1,3-bis(isocyanatomethyl)cyclohexane, or 1,4-bis(isocyanatomethyl)cyclohexane is used, because a composition having high film formability can be produced.

Examples of (meth)acrylate having at least one hydroxyl group per molecule include mono(meth)acrylate of divalent alcohols such as ethylene glycol, propylene glycol, 1,3-propanediol, 1,3-butanediol, 1,4-butanediol, or polyethylene glycol, and mono(meth)acrylate or di(meth)acrylate of trivalent alcohol such as trimethylolethane, trimethylolpropane, or glycerin. These may be used each alone or in combination of two or more.

Synthesis processes of Component (A), urethane (meth)acrylate oligomer, are not specifically limited, and any known method can be used. For instance, a process disclosed in Japanese Patent Application Laid-Open 2001-163931 or Japanese Patent Application Laid-Open 2006-104340 can be used. For instance, a polyol compound having at least two active hydroxyl groups per molecule and an organic isocyanate compound having at least two isocyanate groups per molecule are reacted at a molar ratio of 1:1 to 1:2 in a dilution agent to produce a urethane prepolymer. Subsequently, the remaining isocyanate groups in the urethane prepolymer produced and an adequate amount of (meth)acrylate having at least one hydroxyl group per molecule are reacted to produce a urethane (meth)acrylate oligomer.

In the present invention, Component (B), phenoxy resin, is used as a film forming aid to keep the adhesive composition at a solid state at ordinary temperature. Examples of Component (B), phenoxy resin, include bis-phenol phenoxy resins, novolac phenoxy resins, naphthalene phenoxy resins, and biphenyl phenoxy resins. These may be used each alone or in combination of two or more. Among the phenoxy resins particularly preferred are bis-phenol phenoxy resins, in view of film formability. Preferably the phenoxy resin has a weight-average molecular weight of 30,000 to 70,000. The phenoxy resin is used for keeping the adhesive composition at a solid state at ordinary temperature. An unmodified phenoxy resin is more preferable in order to prevent unexpected curing caused during a modification reaction.

Component (B), phenoxy resin, that can be used is commercially available. Examples of the marketed product include Phenotohto YP-50, Phenotohto YP-50S, Phenotohto YP-55, Phenotohto YP-70, and FX280 (trademark) available from Tohto Kasei Co., Ltd.; JER1256, JER4250, and JER4275 (trademark) available from Japan Epoxy Resins Co., Ltd.; and PKHB, PKHC, PKHH, PKHJ, PKFE, PKHP-200, PKHP-80, PKHB-100, and PKHB-300 (trademark) available from InChem Corporation.

The upper limit of the amount of Component (B) of the present invention is 70 parts by mass, preferably 60 parts by mass, more preferably 50 parts by mass, based on 100 parts by mass of Component (A), and the lower limit is 5 parts by mass, preferably 10 parts by mass, more preferably 40 parts by mass, based on 100 parts by mass of Component (A). In an amount above the upper limit, the uncured composition does not develop flowability by heat. In an amount below the lower limit, the uncured composition cannot be present in a solid state at ordinary temperature and exhibits extremely high tackiness. As a result, the composition cannot be readily handled.

In the present invention, Component (A), urethane (meth)acrylate oligomer, and Component (B), phenoxy resin, described above can be used without limitation. However, if Component (A) has a skeletal structure with a low rigidity such as a $C_8$ or more long-chain alkylene segment, or if Component (B) has a weight-average molecular weight of less than 10,000, the uncured composition may have a loss tangent of less than 1 at 25° C. or the temperature at which the loss tangent of the uncured composition reaches 1 or more may be higher than 80° C.

In the present invention, Component (C), photopolymerization initiator, can be used without limitation. Examples of the photopolymerization initiator include benzophenone, 4,4-bis(diethylamino)benzophenone, 2,4,6-trimethylbenzophenon, methylorthobenzoyl benzoate, 4-phenylbenzophenon, t-butyl anthraquinone, 2-ethylanthraquinone, diethoxyacetophenone, 2-hydroxy-2-methyl-1-phenylpropane-1-one, benzyl dimethyl ketal, 1-hydroxycyclohexyl phenyl ketone, benzoin methyl ether, benzoin ethyl ether, benzoin isopropyl ether, benzoin isobutyl ether, 2-methyl-[4-(methylthio)phenyl]-2-morpholino-1-proanone, 2-benzyl-2-dimethylamin-1-(4-morpholinophenyl)butanone-1, diethylthioxanthone, isopropylthioxanthone, 2,4,6-trimethylbenzoyl diphenyl phosphine oxide, bis(2,6-dimethoxybenzoyl)-2,4,4-trimethylpentyl phosphine oxide, bis(2,4,6-trimethylbenzoyl) phenyl phosphine oxide, 2-hydroxyl-1-[4-[4-(2-hydroxy-2-methylpropionyl)benzyl]phenyl]-2-methylpropane-1-one, and methylbenzoyl formate. These may be used each alone or in combination of two or more.

The upper limit of the amount of Component (C) of the present invention is 10 parts by mass, preferably 6 parts by mass, based on 100 parts by mass of Component (A), and the lower limit is 0.1 part by mass, preferably 0.5 part by mass, more preferably 3 parts by mass, based on 100 parts by mass of Component (A). An amount above the upper limit impairs the preservation stability of the uncured composition and physical properties of the cured composition. In an amount below the lower limit, a proper photocurability is not produced.

In the photocurable adhesive composition of the present invention, the upper limit of elastic modulus for the cured composition is preferably $1.0 \times 10^9$ Pa, more preferably $1.0 \times 10^7$ Pa, and the lower limit is preferably $1.0 \times 10^4$ Pa, more preferably $1.0 \times 10^5$ Pa. The elastic modulus in this description is a storage modulus in units of Pa measured by a dynamic mechanical analyzer. Above the upper limit, warp in the cover panel or stress from the outside propagates to the liquid crystal panel, causing defects in display in some cases. Preferably the cured composition has a total light transmittance of 85% or more. At a transmittance below 85%, the liquid crystal panel has a reduced brightness.

The photocurable adhesive composition of the present invention may contain various components, in addition to the components described above within the range not impairing the advantageous effects of the present invention, if necessary. Examples of such components include known additives such as saturated urethane (meth)acrylate, leveling agents, antioxidants, light stabilizers, ultraviolet absorbing agents, polymerization inhibitors, and silane coupling agents.

The addition of an antioxidant and a light stabilizer among the aforesaid optional components are preferable for enhancing the storage stability of the photocurable adhesive composition and the weatherability of the cured composition. The antioxidant and the light stabilizer that can be used are commercially available. Examples of the marketed products include Sumilizer BHT, Sumilizer S, Sumilizer BP-76, Sumilizer MDP-S, Sumilizer GM, Sumilizer BBM-S, Sumilizer WX-R, Sumilizer NW, Sumilizer BP-179, Sumilizer BP-101, Sumilizer GA-80, Sumilizer TNP, Sumilizer TPP-R, and Sumilizer P-16 (trademark) available from Sumitomo Chemical Co., Ltd.; Adeka Stab AO-20, Adeka Stab AO-30, Adeka Stab AO-40. Adeka Stab AO-50. Adeka Stab AO-60. Adeka Stab AO-70, Adeka Stab AO-80, Adeka Stab AO-330. Adeka Stab PEP-4C, Adeka Stab PEP-8, Adeka Stab PEP-24G, Adeka Stab PEP-36. Adeka Stab HP-10. Adeka Stab 2112, Adeka Stab 260, Adeka Stab 522A, Adeka Stab 329K, Adeka Stab 1500, Adeka Stab C, Adeka Stab 135A, and Adeka Stab 3010 (trademark) available from Adeka Corporation: Tinuvin 770, Tinuvin 765, Tinuvin 144, Tinuvin 622, Tinuvin 111. Tinuvin 123, and Tinuvin 292 (trademark) available from Ciba Specialty Chemicals KK: Fancryl FA-711M and FA-712HM (trademark) available from Hitachi Chemical Co., Ltd.; and Double Chisorb 292 (trademark) available from Bond Chemical KK. The contents of the antioxidant and the light stabilizer are not specifically limited, and range from preferably 0.001 parts to 5 parts by mass, more preferably 0.01 parts to 3 parts by mass, based on 100 parts by mass of Component (A), urethane (meth)acrylate oligomer.

Any known process can be used for shaping the photocurable adhesive composition of the present invention into a sheet or a film. For instance, the composition of the present invention is diluted with a solvent such as methyl ethyl ketone to prepare coating solution, which is applied to a base of a polyethylene terephthalate (PET) film treated with a releasing agent by flow coating, roll coating, gravure roll coating, wire-bar coating, or lip die coating. Subsequently, the solvent is dried to produce a sheet or film having a given thickness of the composition. In preparation of the coating solution, dilution may be performed with a solvent before or after the mixing of the components.

In the following Examples, the present invention will be described in more detail, but not limited thereto.

Materials

Each component used in the Examples and Comparative Examples was as follows:

<Component (A): Urethane Acrylate Oligomer>

Urethane acrylate oligomer (1): polycarbonate urethane acrylate having a weight-average molecular weight of 60,000 produced in Synthesis Example 1 described below (abbreviated as "UA-1" below in some cases)

Urethane acrylate oligomer (2): polycarbonate urethane acrylate having a weight-average molecular weight of 20,000 produced in Synthesis Example 2 described below (abbreviated as "UA-2" below in some cases)

Urethane acrylate oligomer (3): polyether urethane acrylate having a weight-average molecular weight of 33,000, UN-6301 (trademark) available from Negami Chemical Industrial Co., Ltd. (abbreviated as "UA-3" below in some cases)

<Comparative Component (A): Urethane Acrylate Oligomer>

Urethane acrylate oligomer (C1): polycarbonate urethane acrylate having a weight-average molecular weight of 15,000 produced in Comparative Synthesis Example 1 described below (abbreviated as "UA-C1" below in some cases)

Epoxy acrylate: weight-average molecular weight of 520, EA-1020 (trademark) available from Shin-Nakamura Chemical Co., Ltd. (abbreviated as "UA-C2" below in some cases)

<Component (B): Phenoxy Resin>

Phenoxy resin (1): phenoxy resin having a bisphenol structure with a weight-average molecular weight of 50.000. Phenotohto YP-70 (trademark) available from Tohto Kasei Co., Ltd. (abbreviated as "YP-70" below in some cases)

Phenoxy resin (2): phenoxy resin having a bisphenol structure with a weight-average molecular weight of 52.000, Phenoxy Resin PKHH (trademark) available from InChem Corporation (abbreviated as "PKHH" below in some cases)

<Comparative Component (B): Phenoxy Resin

Polyvinyl acetal: weight-average molecular weight of 53,000, S-LEC BM-5 (trademark) available from Sekisui Chemical Co., Ltd. (abbreviated as "BM-5" below in some cases)

<Component (C): Photopolymerization Initiator>

Irgacure 184 (2-hydroxy-2-methyl-1-phenylpropane-1-one, available from Ciba Specialty Chemicals K. K.) (abbreviated as "184" below in some cases)

Each of the urethane acrylate oligomers of Component (A) and Comparative component (A) was synthesized as follows.

Synthesis Example 1

Urethane Acrylate Oligomer (1)

Into a glass reaction vessel equipped with a thermometer, a stirrer, and a reflux tube, 582.26 parts by mass of methyl ethyl ketone, 59.94 parts by mass of isophorone diisocyanate, 0.05 part by mass of 4-methoxyphenol, and 0.1 part by mass of dibutyltin dilaurate are fed and heated to 60° C. with stirring. Into the mixture, 520 parts by mass of polycarbonate diol (T5651 (trademark) available from Asahi Kasei Chemicals Corporation) was added dropwise and was heated to 70° C. After completion of the addition of polycarbonate diol, the mixture was reacted for 3 hours with stirring. Subsequently, 2.32 parts by mass of 2-hydroxyethyl acrylate was added dropwise, and after completion of the addition of 2-hydroxyethyl acrylate, the mixture was reacted for 3 hours with stirring. The termination of the reaction was confirmed by dissipation of the isocyanate groups by infrared spectroscopy. Polycarbonate urethane acrylate was prepared thereby. The weight-average molecular weight of polycarbonate urethane acrylate was 60,000.

Synthesis Example 2

Urethane Acrylate Oligomer (2)

The process of Synthesis Example 1 was carried out except that 511.3 parts by mass of methyl ethyl ketone, 55.5 parts by mass of isophorone diisocyanate, 0.1 part by mass of 4-methoxyphenol, 0.1 part by mass of dibutyltin dilaurate, 450 parts by mass of polycarbonate diol, and 5.8 parts by mass of 2-hydroxyethyl acrylate were used. The produced polycarbonate urethane acrylate had a weight-average molecular weight of 20,000.

Comparative Synthesis Example 1

Urethane Acrylate Oligomer (C1)

The process of Synthesis Example 1 was carried out except that 413.58 parts by mass of methyl ethyl ketone, 46.62 parts by mass of isophorone diisocyanate, 0.1 part by mass of 4-methoxyphenol, 0.1 part by mass of dibutyltin dilaurate, 360 parts by mass of polycarbonate diol, and 6.96 parts by mass of 2-hydroxyethyl acrylate were used. The produced polycarbonate urethane acrylate had a weight-average molecular weight of 15,000.

Comparative Synthesis Example 2

Urethane Acrylate Oligomer (C3)

In order to produce polycarbonate urethane acrylate having a weight-average molecular weight of approximately 120,000, the process of Synthesis Example 1 was carried out except that 620 parts by mass of methyl ethyl ketone, 63 parts by mass of isophorone diisocyanate, 0.1 part by mass of 4-methoxyphenol, 0.1 part by mass of dibutyltin dilaurate, 550 parts by mass of polycarbonate diol, and 1.2 parts by mass of 2-hydroxyethyl acrylate were used. The intended polycarbonate urethane acrylate was not produced, because the reactants gelled during the reaction.

The weight-average molecular weight of each material described above was measured by gel permeation chromatography (GPC) and calculated using polystyrene conversion. The measurement conditions for GPC were as follows.
  Column: Shodex DS-4 (trademark, available from Showa Denko K. K.)
  Column temperature: 40° C.
  Mobile phase solvent: tetrahydrofuran (TH-IF)
  Flow rate of solvent: 1.0 milliliter/min
  Detector: Differential refractive index detector (RI-71 (trademark), available from Showa Denko K. K.)
  Concentration of sample: 5.0%
Testing Method
The following testing methods were used in Examples and Comparative Examples.
<Film Formability Test>

Each adhesive composition was diluted with a solvent (methyl ethyl ketone) in the same mass as Component (A), urethane acrylate oligomer, contained in the composition to prepare a coating solution. A polyethylene terephthalate (PET) film treated with a releasing agent was coated with the coating solution using a bar coater into a dried film thickness of 30 μm. The film was about 200 mm in length and 250 mm in width. The solvent was then evaporated in a drying furnace conditioned at approximately 80° C. to produce a sheet composition, which was visually observed as it was held on the polyethylene terephthalate film. The results of the observation were graded as follows.
  A: uniform and very smooth.
  B: nearly uniform, a slight number of bumps and pinholes on the surface.
  C: not uniform, many bumps and pinholes on the surface.
<Loss Tangent (tan δ) Evaluation Test>

A sheet composition was produced as in the film formability test. The sheet composition was then detached from the PET film to produce a laminated specimen having a thickness of 0.6 mm. The loss tangent of the specimen was measured with a rheometer. A loss tangent of less than 1 indicates that solid characteristics are dominant, while a loss tangent of not less than 1 indicates that liquid characteristics are dominant.

The measurement conditions using the rheometer were as follows. The loss tangent at 25° C. and the temperature at which the loss tangent reaches 1 were measured in the temperature range of 15° C. to 120° C.
  Instrument: DAR-100 (trademark, available from Reologica Instruments AB)
  Measurement mode: Oscillation strain control
  Geometry: P25 Gap 0.6 mm
  Frequency: 1 Hz
  Strain: $1.0 \times 10^{-3}$
<Elastic Modulus after Curing (of Cured Composition)>

The sheet composition held on the PET film produced by the processes as in the film formability test was cured by being irradiated with ultraviolet rays of an integrated intensity of 30 kJ/m$^2$. The elastic modulus of the cured composition was then measured. The instrument used was a dynamic mechanical analyzer (DMS6100 (trademark) available from Seiko Instruments Inc.). The sheet composition was detached from the PET film to prepare a laminated specimen having a thickness of 0.7 mm. The specimen was adjusted such that the measurable region was 20 mm long and 10 mm wide. The elastic modulus was measured in the temperature range of −40° C. to 100° C. The elastic modulus at 25° C. was determined. The measuring frequency was 1 Hz.
<Transmittance Test>

The sheet composition held on the PET film produced by the process as in the film formability test was attached to a surface of a glass plate of 3.0 mm by 25 mm by 50 mm such that the sheet composition was in contact with the entire surface of the glass plate and was cured by being irradiated with ultraviolet rays of an integrated intensity of 30 kJ/m$^2$. Subsequently, the sheet composition was detached from the PET film for use as a specimen. The total light transmittance of the specimen was measured with a turbidity meter (NDH2000 (trademark), available from Nippon Denshoku Industries Co., Ltd.) in accordance with JIS-K-7361-1. The results were graded as follows.
  A: accepted; total light transmittance of 85% or more.
  C: rejected; total light transmittance of lower than 85%.
<Bumps Following Test>

A 10 mm-wide frame was printed with black ink along and within each side at an edge on a surface of the glass plate of 0.7 mm by 50 mm by 100 mm. The thickness of the ink was 10 μm. After the sheet composition held on the PET film produced by the processes as in the film formability test was attached to an entire surface of another glass plate of 0.7 mm by 50 mm by 100 mm such that the sheet composition was in contact with the glass plate, the PET film was detached. Subsequently, the surface printed with the black ink of the glass plate was disposed so as to come into contact with the sheet composition, and the both glass plates were thermocompression bonded with a vacuum thermocompression bonding device for visual observation of the laminated portion. In bonding by the vacuum thermocompression bonding device, the temperature was 80° C., the pressure was 0.1 MPa, and the pressure maintenance time was 90 sec. The results of the observation were graded as follows.
  A: accepted; bumps by the black ink were sufficiently filled with the composition.
  C: rejected; bumps by the black ink were not sufficiently filled with the composition, leaving voids.

Examples 1 to 6 and Comparative Examples 1 to 5

Tables 1 and 2 show the contents of the components and the results of the tests. In Tables 1 and 2, the numerical value of each component is represented in unit of part by mass, while the blank means zero part by mass.

TABLE 1

| Component | Adhesive composition | Example 1 | Example 2 | Example 3 | Example 4 | Example 5 | Example 6 |
|---|---|---|---|---|---|---|---|
| (A) | UA-1 (Mw = 60,000) | 100 | | | 100 | 100 | 100 |
| | UA-2 (Mw = 20,000) | | 100 | | | | |
| | UA-3 (Mw = 33,000) | | | 100 | | | |
| (B) | YP-70 | 65 | 65 | 65 | 10 | 43 | |
| | PKHH | | | | | | 65 |
| (C) | 184 | 4.3 | 4.3 | 4.3 | 4.3 | 4.3 | 4.3 |
| Results of Evaluation | Film formability | A | B | B | B | A | B |
| | Loss tangent at 25° C. | 0.3 | 0.4 | 0.3 | 0.5 | 0.5 | 0.2 |
| | Temperature at which loss tangent reaches 1 (° C.) | 73.5 | 53.2 | 69.2 | 23.1 | 46.8 | 74.2 |
| | Elastic modulus after curing (Pa) | $8.6 \times 10^6$ | $7.2 \times 10^6$ | $6.7 \times 10^6$ | $4.2 \times 10^5$ | $3.6 \times 10^6$ | $9.4 \times 10^6$ |
| | Total light transmittance | A | A | A | A | A | A |
| | Bump followability | A | A | A | A | A | A |

In Table 1, "A" for film formability indicates "very good" and "B" indicates "good", and "A" for total light transmittance and step followability indicates "good".

TABLE 2

| Component | Adhesive composition | Comparative Example 1 | Comparative Example 2 | Comparative Example 3 | Comparative Example 4 | Comparative Example 5 |
|---|---|---|---|---|---|---|
| (A) | UA-1 (Mw = 60,000) | | | 100 | 100 | 100 |
| | UA-C1 (Mw = 15,000) | 100 | | | | |
| | UA-C2 (Mw = 520) | | 100 | | | |
| (B) | YP-70 | 43 | 43 | 100 | 2 | |
| | BM-5 | | | | | 30 |
| (C) | 184 | 3 | 3 | 3 | 3 | 3 |
| Results of Evaluation | Film formability | C | B | B | C | *1 |
| | Loss tangent at 25° C. | 1.1 | 0.2 | not more than 0.1 | 0.4 | *1 |
| | Temperature at which loss tangent reaches 1 (° C.) | 38.7 | 62.4 | 92.4 | 41.7 | *1 |
| | Elastic modulus after curing (Pa) | $5.3 \times 10^6$ | $2.3 \times 10^9$ | $3.7 \times 10^8$ | $3.4 \times 10^5$ | *1 |
| | Total light transmittance | A | A | A | A | C |
| | Bump followability | A | C | C | A | A |

In Table 2, "A" for film formability indicates "very good", "B" indicates "good", and "C" indicates "not good", and "A" for total light transmittance and step followability indicates "good" and "C" indicates "not good".

In Table 2, "*1" indicates that no stable data was obtained because the components were not homogeneously mixed and a film was not formed.

In Examples 1 to 3, the weight-average molecular weight of Component (A), urethane (meth)acrylate oligomer, was varied within the scope of the present invention. Satisfactory results were obtained in all the Examples. In each of Examples 4 and 5, the amount of Component (B) was decreased compared to Example 1 within the scope of the present invention. Satisfactory results were obtained in both. In particular, Example 5 showed excellent results such as high film formability and a proper elastic modulus after curing. In Example 6, the type of Component (B) was changed from that in Example 1. Satisfactory results were obtained as in Example 1.

Meanwhile, in Comparative Example 1, the weight-average molecular weight of Component (A), urethane (meth)acrylate oligomer, was varied from that in Example 5 to the outside of the scope of the present invention. The composition was liquid at 25° C. and exhibited significantly low film formability. In Comparative Example 2, epoxy acrylate having a significantly low average weight molecular weight was used instead of Component (A) in Example 5. The composition in Comparative Example 2 had significantly low followability to bumps and significantly a high elastic modulus after curing. In Comparative Example 3, the amount of Component (B) was increased beyond the scope of the present invention. The composition in Comparative Example 3 had a high melting temperature that damaged the liquid crystal panel, and had significantly low followability to bumps. In Comparative Example 4, the amount of Component (B) was reduced below the range of the present invention. The composition in Comparative Example 4 had low film formability. In Comparative Example 5, polyvinyl acetal was used instead of Component (B) phenoxy resin. No stable data was obtained, because the components were not homogeneously mixed and a film was not formed. The composition in Comparative Example 5 had a low total light transmittance. In Comparative Example 2, Component (A), urethane (meth)acrylate oligomer, having a weight-average molecular weight of higher than that of the present invention was tried to prepare, but it was not produced due to uncontrolled reaction producing gel.

Since the photocurable adhesive composition of the present invention can melt at low temperature, adherends are not damaged during bonding processes. The composition also can bond rugged adherends without forming a gap therebetween. The composition is effectively used for bonding a liquid crystal panel to a cover panel, in particular. In the case of use of the composition for bonding of the liquid crystal panel to the cover panel, the liquid crystal panel is not damaged and the rugged adherends can be bonded without forming a gap therebetween.

The invention claimed is:

1. A method for manufacturing a liquid crystal panel employing a photocurable adhesive composition, the method comprising:
   (i) arranging a solid sheet or film of an uncured photocurable adhesive composition between a liquid crystal panel and a cover panel of the liquid crystal panel in preparation of forming a bond, wherein the uncured photocurable adhesive composition is solid at 25° C. and melts at a temperature in a range of 40° C. to 80° C.;
   (ii) heating the uncured photocurable adhesive composition to a temperature in a range of 40° C. to 80° C. at which the uncured photocurable adhesive composition melts, whereby a melted uncured photocurable adhesive composition between the liquid crystal panel and the cover panel of the liquid crystal panel is provided;
   (iii) irradiating the melted uncured photocurable adhesive composition with an active energy ray, whereby the uncured photocurable adhesive composition becomes a cured photocurable adhesive composition that bonds with the liquid crystal panel and the cover panel of the liquid crystal panel to provide a manufactured liquid crystal panel;
   wherein the photocurable adhesive composition comprises:
   (A) 100 parts by mass of a urethane(meth)acrylate oligomer having a weight-average molecular weight in a range of 20,000 to 100,000, which is a reaction product of polycarbonate diol produced by copolymerizing 1,6-hexanediol, 1,5-pentanediol, and dialkyl carbonate having one to six carbon atoms, an organic isocyanate compound having at least two isocyanate groups per molecule, an (meth)acrylate having at least one hydroxyl group per molecule;
   (B) 5 parts to 70 parts by mass of an unmodified phenoxy resin having a weight-average molecular weight in a range of 30,000 to 70,000; and
   (C) 0.1 parts to 10 parts by mass of a photopolymerization initiator.

2. The method for manufacturing a liquid crystal panel according to claim 1, wherein the active energy ray comprises ultraviolet energy.

3. The method for manufacturing a liquid crystal panel according to claim 1, wherein the uncured photocurable adhesive composition has a loss tangent (loss modulus/storage modulus) of 0.1 to 0.6 at 25° C., and the temperature at which the loss tangent of the uncured photocurable adhesive composition reaches 1 or more is in the melting temperature range of 40° C. to 80° C., the loss tangent being measured at a frequency of 1 Hz.

4. The method for manufacturing a liquid crystal panel according to claim 1, wherein the cured photocurable adhesive composition has an elastic modulus of $1.0 \times 10^5$ Pa to $1.0 \times 10^7$ Pa.

5. The method for manufacturing a liquid crystal panel according to claim 1, wherein the cured photocurable adhesive composition has a total light transmittance of 85% or more.

* * * * *